United States Patent [19]

Kohayakawa

[11] Patent Number: 4,609,287

[45] Date of Patent: Sep. 2, 1986

[54] METHOD OF AND APPARATUS FOR MEASURING REFRACTIVE CHARACTERISTICS

[75] Inventor: Yoshimi Kohayakawa, Yokohama, Japan

[73] Assignee: Canon Kabushiki Kaisha, Tokyo, Japan

[21] Appl. No.: 503,234

[22] Filed: Jun. 10, 1983

[30] Foreign Application Priority Data

Oct. 5, 1982 [JP] Japan .................................. 57-175847
Mar. 9, 1983 [JP] Japan .................................. 58-39804
Mar. 28, 1983 [JP] Japan .................................. 58-52197
Apr. 13, 1983 [JP] Japan .................................. 58-66254

[51] Int. Cl.$^4$ ............................................. G01B 9/00
[52] U.S. Cl. .................................... 356/124; 356/125; 356/127
[58] Field of Search ............... 356/124, 125, 126, 127

[56] References Cited

U.S. PATENT DOCUMENTS

| | | | |
|---|---|---|---|
| 3,880,525 | 4/1975 | Johnson | 356/127 |
| 4,033,696 | 7/1977 | Nohda | 356/126 |
| 4,139,305 | 2/1979 | Lapornik | 356/125 |
| 4,275,964 | 6/1981 | Vassiliadis | 356/127 |
| 4,281,926 | 4/1981 | Cornsweet | 356/124 |

FOREIGN PATENT DOCUMENTS

0168529 12/1981 Japan .

Primary Examiner—R. A. Rosenberger
Assistant Examiner—Crystal Cooper
Attorney, Agent, or Firm—Fitzpatrick, Cella, Harper & Scinto

[57] ABSTRACT

At least three light beams are applied to different positions on an optical element to be measured. The light beams coming via the optical element to be measured are received through a light-receiving lens by a two-dimensional light position detecting system provided at the rearward focus position of the light-receiving lens or at a position conjugate therewith or are received by two-dimensionally disposed light position detecting system. Three deviation vectors are detected and the refractive powers in three meridian directions are detected, or at least five light beams are applied to different positions on an optical element to be measured and from five deviated beam positions, a general elliptical curve coupling them is specified, whereby the degree of astigmatism, the direction of astigmatism and the refractive power are calculated.

8 Claims, 23 Drawing Figures

METHOD OF AND APPARATUS FOR MEASURING REFRACTIVE CHARACTERISTICS

BACKGROUND OF THE INVENTION

1. Field of the Invention

This invention relates to a method of and an apparatus for measuring refractive characteristics.

2. Description of the Prior Art

In most of lens meters and ophthalmometers available in commercial markets, measurement of refractive characteristics is carried out manually and therefore, much time is required for the measurement and the measuring procedure is cumbersome. On the other hand, automatic lens meters in which measurement is carried out automatically are known from U.S. Pat. Nos. 4,180,325 and 4,182,572. These automatic lens meters are such that the degree of beam deviation is detected from the absolute time during which and the phase at which a spot image light relatively crosses the dark and light portions of the moving boundary locus, and in such lens meters, the fluctuation of the light-reception accuracy by the position of the light-receiving element is decreased while, on the other hand, the presence of movable portions leads to the complexity and poor durability of the apparatus. The measurement principle of the apparatuses shown in the aforementioned U.S. patents is that the degree of astigmatism, the direction of astigmatism and the refractive power are calculated from two astigmatisms in the two ranges of 0°–90° and 45°–135° and one spherical equivalent.

SUMMARY OF THE INVENTION

It is an object of the present invention to provide a simple apparatus for and a simple method of measuring refractive characteristics in which no movable portion is present and the calculating process is easy.

It is a further object of the present invention to provide an apparatus for and a method of measuring refractive characteristics in which at least three light beams are applied to different positions on an optical element to be examined and the refractive powers in three meridian directions or at least five light beams are applied to different positions on the optical element to be examined and a general elliptical curve coupling five deviated beam positions is specified, whereby the degree of astigmatism, the direction of astigmatism and the refractive power are calculated.

It is still a further object of the present invention to provide an apparatus for and a method of measuring refractive characteristics in which two-dimensional light position detecting means or a two-dimensionally disposed light position detecting element is provided at the rearward focus position of a light-receiving lens or at a position conjugate therewith and accurate measurement can be carried out irrespective of the position on the optical axis of the optical element to be examined.

The invention will become fully apparent from the following detailed description thereof taken in conjunction with the accompanying drawings.

DETAILED DESCRIPTION OF THE PREFERRED EMBODIMENTS

Figure 1:
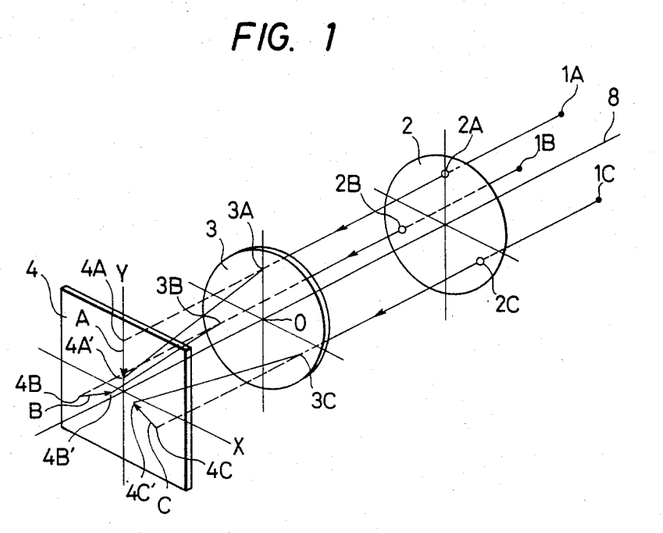
FIG. 1 illustrates the principle of the present invention using three or more light beams.

Referring to FIG. 1, three light sources 1A, 1B and 1C such as LEDs are successively turned on. An aperture plate 2 has three apertures 2A, 2B and 2C on circumferences centered at points on the optical axis 8 which correspond to the light sources 1A, 1B and 1C, and a light passing through these apertures becomes three light beams, which impinge on points 3A, 3B and 3C on a lens 3 to be examined and are refracted by the lens 3 to be examined and thereafter enter a two-dimensional light position detecting element 4. The detecting element 4 may be a single element such as a semiconductor position detector which puts out an analog signal or an array element such as a CCD.

The light sources 1A, 1B and 1C are disposed equidistantly from the optical axis 8 and the straight line passing through each light source and the optical axis forms an angle of 120° with respect to other similar straight lines. The apertures 2A, 2B and 2C of the aperture plate 2 are in a similar relation and thus, the three light beams are parallel to one another and to the optical axis 8. When the lens 3 to be examined is absent, the beams pass to points 4A, 4B and 4C on the detecting element 4. When the lens 3 to be examined is present, the beams are refracted and enter points 4A', 4B' and 4C'. Deviation vectors A, B and C passing from the points 4A, 4B and 4C to the points 4A', 4B' and 4C' after refraction provide the refractive characteristics (namely, the refractive power, the degree of astigmatism and the direction of astigmatism) of the lens 3 to be examined and the position information regarding the deviation of the center of the lens to be examined from the optical axis 8. The angle at which the light beams are refracted by the lens 3 to be examined, when the paraxial ray is considered, is proportional to the refractive power of the lens to be examined and the distance between the impinging beam and the center 0 of the lens. The sizes of the vectors A, B and C are proportional not only to said angle but also to the distance between the lens 3 to be examined and the detecting element 4. If the lens surface is approximately a rotational parabolic plane, the degrees of convergence and divergence in the direction passing through two points of the beam incident on two points on the lens are independent of the position of incidence if the spacing between the two points is constant. Thus, alignment can be found by the vector sum of the three deviation vectors A, B and C becoming zero.

That is, design is made such that both the X-direction component and the Y-direction component of the three vectors are zero as follows:

$$A_X + B_X + C_X = 0 \quad (1)$$

$$A_Y + B_Y + C_Y = 0 \quad (2)$$

where $A_X$, $B_X$ and $C_X$ are the X components of the vectors A, B and C and $A_Y$, $B_Y$ and $C_Y$ are the X components of the vectors A, B and C.

By the alignment being so effected, the following measurement of refractive characteristics is carried out accurately. Where the lens 3 to be examined includes a prism action or where the lens is eccentrically used to purposely provide a prism effect, the values of the left sides of equations (1) and (2) provide the prism power at that position.

Now, the lens to be examined generally includes astigmatism, and to find the refractive power in each meridian direction, the refractive powers in at least three meridian directions can be found.

That is, if $\theta$ is the angle in the circumferential direction from a reference meridian direction, the corresponding refractive power D is expressed as a function of $\theta$ as follows:

$$D(\theta) = \alpha \sin^2(\theta + \beta) + \gamma \quad (3)$$

where $\alpha$, $\beta$ and $\gamma$ are constants and represents the degree of astigmatism, the direction of astigmatism and the refractive power, respectively. If, in FIG. 1, the lens surface of the lens 3 to be examined approximates a rotational parabolic plane and if an approximation formula is used with respect to Snell's law regarding the refraction, the degrees of deviation after refraction of the beams impinging on two points on the lens at a predetermined interval are similar between any two points parallel to the direction passing through said two points.

Accordingly, if the refractive power of the lens 3 to be examined in a meridian direction parallel to a direction $\overline{3A3B}$ is $D_{AB}$ and the refractive powers of the lens 3 to be examined in meridian directions parallel to directions $\overline{3B3C}$ and $\overline{3C3A}$ are $D_{BC}$ and $D_{CA}$, respectively, these refractive powers are represented by the sums of the corresponding meridian direction components of the corresponding vectors A, B and C. That is, $$D_{AB} = A_{AB} + B_{BA} \quad (4)$$

$$D_{BC} = B_{BC} + C_{CB} \quad (5)$$

$$D_{CA} = C_{CA} + A_{AC} \quad (6)$$

where $A_{AB}$ represents the size of the component in the direction $\overline{3A3B}$ of the vector A and becomes plus when it passes from 3A to 3B, and becomes minus when it passes from 3B to 3A. This also applies to the other components.

If the refractive powers $D_{AB}$, $D_{BC}$ and $D_{CA}$ in three meridian directions found by the above three equations are substituted into equation (3), the degree of astigmatism $\alpha$, the direction of astigmatism $\beta$ and the refractive power $\gamma$ are found from simultaneous equations.

Incidentally, if 3A, 3B and 3C are points at 120° each on the circumference and a meridian direction parallel to the direction $\overline{3A3B}$ is the reference meridian direction, then the refractive powers $D_{AB}$, $D_{BC}$ and $D_{CA}$ are as follows:

$$D_{AB} = A_{AB} + B_{BA} = \alpha \sin^2 \alpha + \gamma$$

$$D_{BC} = B_{BC} + C_{CB} = \alpha \sin^2(120° + \beta) + \gamma$$

$$D_{CA} = C_{CA} + A_{AC} = \alpha \sin^2(240° + \beta) + \gamma$$

A conventional automatic operating means is used to substitute equations (4) to (6) into equation (3) and solve the simultaneous equation to find the unknown quantities $\alpha$, $\beta$ and $\gamma$.

Now, where a position detector which puts out an analog signal is used as the two-dimensional light position detecting element 4, three beams must be caused to successively enter the lens to be examined in order to detect the position at which each beam irradiates.

This is because if a plurality of beams irradiate the position detector at one time, the irradiating position is not found but a merely averaged irradiating position is only found. However, where an array type element such as CCD is employed as the detecting element 4, three beams can be applied at one time and in such case, use may be made of a single light source instead of three light sources.

Figure 2:
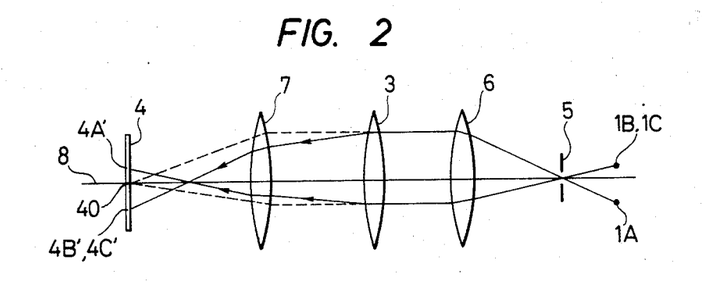
FIG. 2 shows an embodiment using a two-dimensional light position detecting element.

FIG. 2 shows a first embodiment of the apparatus for measuring refractive characteristics in accordance with the present invention.

Designated by 1A, 1B and 1C are three light sources. Although the light sources 1B and 1C are shown as overlapping each other on the plane of the drawing sheet, they are positioned symmetrically with respect to the plane of the drawing sheet as in FIG. 1.

An aperture plate 5 has an opening on the optical axis 8, and a light emergent therefrom enters an incidence lens 6 while forming a thin beam, and becomes a parallel light beam therein and enters a lens 3 to be examined. Thereafter, the light is refracted by the lens 3 to be examined and passes through a light-receiving lens 7 to a two-dimensional light position detecting element 4. In FIG. 2, the broken lines indicate the optical path of the light beam when the lens 3 to be examined is absent.

The detecting element 4 is disposed at the forward focus position of the light-receiving lens 7 and therefore, irrespective of the position of the lens 3 to be examined on the optical axis, the size of the deviation vector is constant on the focal plane and the refractive characteristics are stably detected. Alternatively, the detecting element 4 may be disposed at a position conjugate with the rearward focus position of the light-receiving lens 7.

As previously described, the light sources 1A, 1B and 1C are successively turned on. Alignment is carried out with the deviation of the lens 3 to be examined being detected by the use of equations (1) and (2) and the refractive characteristics in each meridian direction can be measured by the use of equations (3) to (6).

Figure 3:
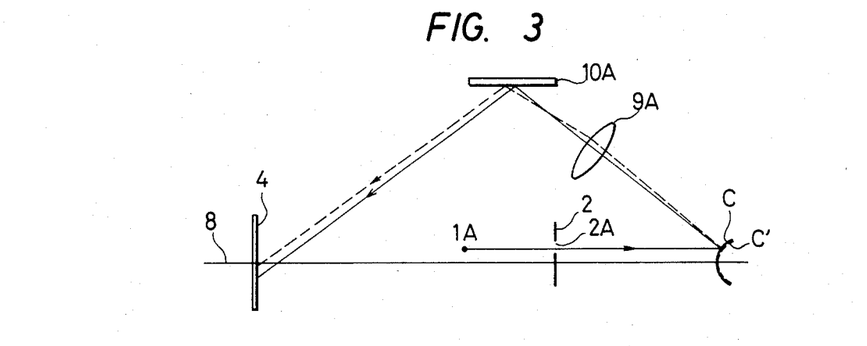
FIG. 3 shows an embodiment applied to an automatic ophthalmometer.
Figure 4:
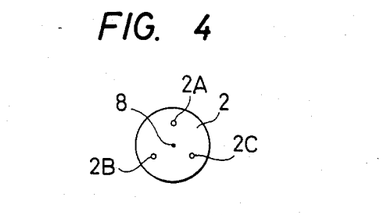
FIG. 4 illustrates an aperture plate.

FIG. 3 shows a second embodiment of the present invention which is applied to an automatic ophthalmometer for measuring the refractive characteristics of the cornea of an eye to be examined. The light emitted from the light source 1A passes through the aperture 2A of an aperture plate 2 shown in FIG. 4 and impinges on the cornea C of the eye to be examined in parallelism to the optical axis 8. The light reflected by the cornea C enters a light-receiving lens 9A and is reflected by a mirror 10A, whereafter it passes to a two-dimensional light position detecting element 4 provided at the rearward focus position of the light-receiving lens 9A.

The angle of reflection varies with the curvature of the cornea, and the light beam position on the detecting element 4 varies correspondingly. The detecting element 4 is provided at the rearward focus position of the light-receiving element 9A and the light coming from the aperture plate 2 is parallel to the optical axis 8. Therefore, the angle of reflection becomes constant even if the cornea C moves on the optical axis.

Figure 5:
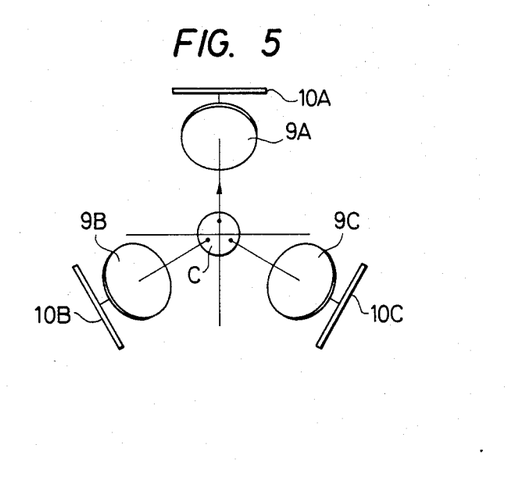
FIG. 5 is a view as seen from the direction of the optical axis.

The corneal astigmatism can be found by the calculation from the deviation vector, as described in connection with the previous embodiment. The light-receiving lenses and the mirrors are three-dimensionally arranged in three meridian directions as shown in FIG. 5, and each light-receiving lens 9A, 9B, 9C forms a set with a respective mirror 10A, 10B, 10C and directs the light beam to the two-dimensional light position detecting element 4 provided at a predetermined position in the direction of the optical axis.

Figure 6:
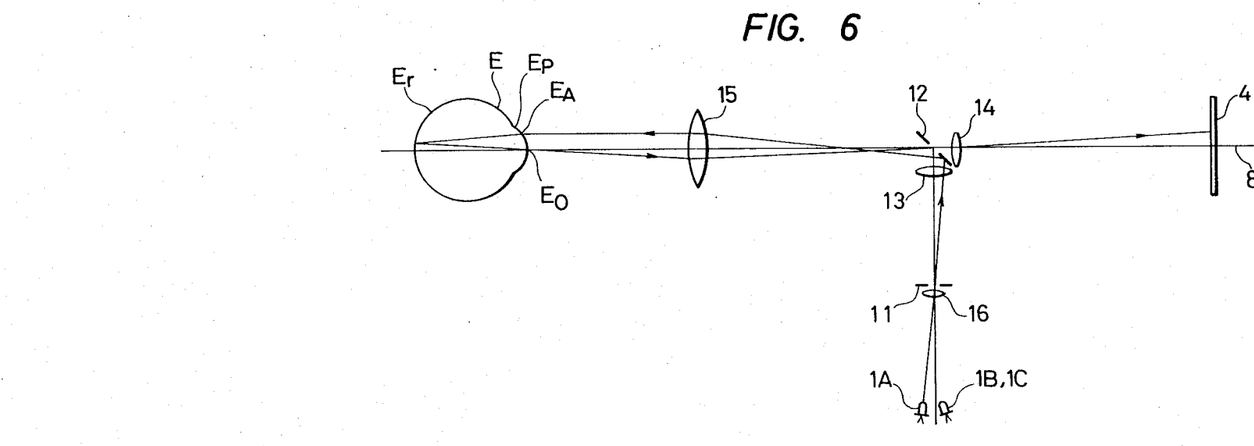
FIG. 6 shows an embodiment applied to an automatic eye-refractometer.
Figure 7:
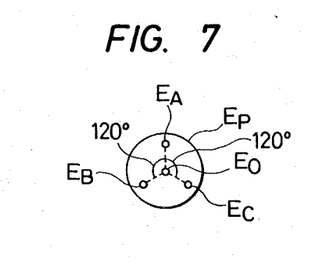
FIG. 7 shows an eye to be examined as seen from the direction of the optical axis.

FIG. 6 shows a third embodiment of the measuring apparatus according to the present invention which is applied to an automatic eye-refractometer. The light emitted from a light source 1A passes through a condensing lens 16, a stop 11 and a lens 13, is reflected by the marginal reflecting portion of an apertured mirror 12, passes through an objective lens 15, becomes parallel to the optical axis 8 and passes to an eye fundus Er through the marginal portion of the pupil Ep of an eye E to be examined, as shown in FIG. 7. The light reflected from the eye fundus Er passes through the central portion Eo of the pupil Ep and further passes through the aperture of the apertured mirror 12 and through a lens 14 to a two-dimensional light position detecting element 4.

The light sources 1A, 1B and 1C, the apertured mirror 12 and the pupil Ep are optically conjugate while, on the other hand, the stop 11, the right-hand focus position of the objective lens 15, the fundus Er of an eye in emmetropia and the detecting element 4 are optically conjugate with one another. That is, the detecting element 4 is provided at a position conjugate with the right-hand focus position of the objective lens 15. If the eye to be examined is in emmetropia, the incident light passes onto the optical axis at the eye fundus and the reflected light returns along the optical axis 8 to the center of the detecting element 4.

If the eye to be examined is out of emmetropia, the light is reflected in a direction inclined with respect to the optical axis as indicated by the solid line and passes to a point deviated from the center of the detecting element 4.

By calculating the deviation of the irradiation position on the detecting element 4 in three meridian directions corresponding to the light sources 1A, 1B and 1C, alignment is accomplished as already described and further, the refractive power of the eye E to be examined is found.

In the present embodiment, the light beam is taken out from the pupil center Eo, but alternatively, the light beam may be taken out from points at which the points of incidence are symmetrical with respect to the pupil. In this latter case, the apertured mirror 12 must be provided with three light-transmitting portions.

Figure 8:
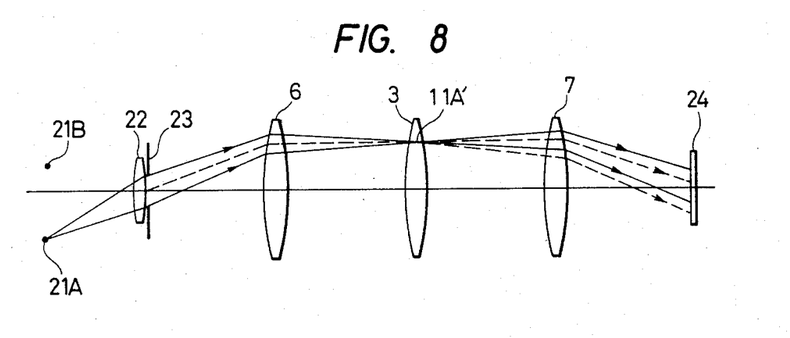
FIG. 8 shows an embodiment using a plural-division element.

FIG. 8 shows an embodiment in which a plural-division element is used as the detecting element. In this embodiment, an optical element to be examined is illuminated in a spot-like form and the position of the center of gravity of the light beam passed through the optical element to be examined is detected by the plural-division element. In FIG. 8, reference characters 21A, 21B and 21C (not shown) designate three light sources. The light sources 21B and 21C are shown as overlapping each other on the plane of the drawing sheet, but they are positioned symmetrically with respect to the plane of the drawing sheet as in FIG. 1.

The light beam from the light source 21A passes through a lens 22 and a stop 23 and further passes through a lens 6, and the principal ray thereof becomes parallel to the optical axis. The stop 23 is provided on the optical axis at the focus position of the lens 6 and has a predetermined opening. The opening may be of any shape such as circular or square, but if it is of a square shape, area detection will become easier in the relation to a plural-division element to be described, and as a result, position detection will become easier. Designated by 3 is a lens to be examined which may be, for example, a cylindrical lens. Of the light beam passed through the lens 6, the light before the lens 3 to be examined is inserted in the optical path as indicated by solid lines and the light beam after the lens 3 is inserted in the optical path is indicated by dot-and-dash lines. The light beam passed through the lens 6 enters a light-receiving lens 7 and is received by a plural-division element 24 provided at the focus position of the light-receiving lens 7 or a position conjugate therewith.

When the lens 3 to be examined is absent, the image of the opening of the stop 23 is projected upon the plural-division element 24 and, when the lens 3 to be examined is inserted in the optical path, the defocused image of the opening of the stop 23 is projected and the position of the center of gravity thereof is detected.

Now, if the position of the lens 3 to be examined on the optical axis is made conjugate with the light sources 21A–21C, the width of the light beam to the plural-division element 24 becomes substantially constant irrespective of the lens to be examined, and precise measurement can be accomplished with the area of the beam incident on the lens to be examined being minimized.

Figure 9:
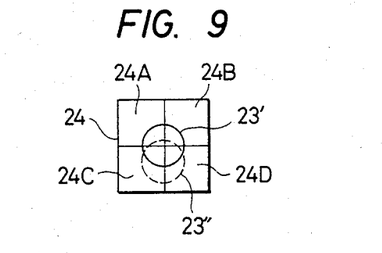
FIG. 9 shows the plural-division element as seen from the direction of the optical axis.

The plural-division element 24 comprises, for example, four-division elements 24A, 24B, 24C and 24D as shown in FIG. 9, and the central position of the light beam received thereby can be determined from the distribution of quantity of light to each element. The plural-division element 24 lies at a position conjugate with the stop 23 and, when the lens 3 to be examined is absent in the optical path, the light beam passed through the stop 23 enters the plural-division element 24 as a light beam of the range of the stop image 23' and, when the lens 3 to be examined is present in the optical path, the light beam passed through the stop 23 enters the plural-division element 24 as a light beam of the range of the stop image 23".

Figure 10:
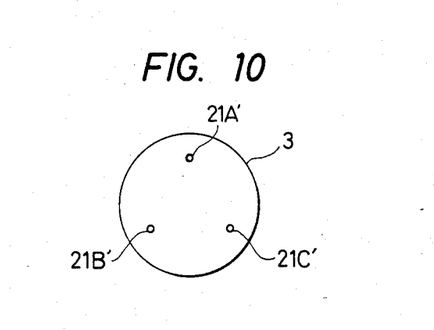
FIG. 10 shows a lens to be examined as seen from the direction of the optical axis.

When the lens 3 to be examined is absent in the optical path, the distributions of quantity of light to the division elements 24A–24D are equal, but when the lens 3 to be examined is present in the optical path, the distributions of quantity of light to the division elements become unequal and, from the direction and amount of deviation thereof, the displacement of the central position of the received light beam by the presence of the lens 3 to be examined is detected. This displacement becomes greater as the refractive characteristics of the lens 3 to be examined become greater. FIG. 10 shows the lens 3 to be examined as viewed with the measuring beam from the direction of the optical axis.

As previously described, the light sources 21A, 21B and 21C are provided at positions conjugate with the lens 3 to be examined with respect to lenses 6 and 22.

That is, by the lens 22 being provided, the images of the light sources 21A, 21B and 21C are formed at the position of the lens 3 to be examined, the measurement area of the lens 3 to be examined becomes spot-like and measurement of good accuracy is accomplished. Therefore, the lens 22 is a condensing lens for the light beams or images of the light sources 21A, 21B and 21C.

In the foregoing description, accuracy becomes better as the diameter of the light beam entering the plural-division element is greater and therefore, the area of the opening of the stop 23 can be made greater. The shape of the opening of the stop 23 is not restricted to a circle, but may be any other shape, for example, a square.

The number of divisions of the plural-division element is not limited to four, but may be any other plurality. Further, the central position of the plural-division element need not always be on the optical axis, but even if it is deviated from the optical axis in a plane perpendicular to the optical axis, measurement of the refractive characteristics can be accomplished with the amount of offset thereof being taken into account.

Figure 11:
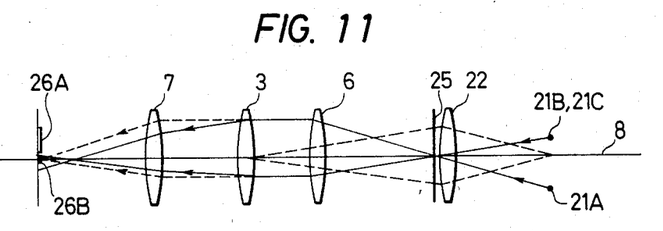
FIG. 11 shows an embodiment using two one-dimensional light position detecting elements orthogonal to each other.
Figure 12:
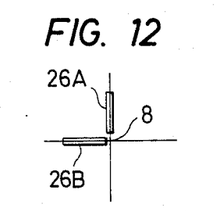
FIG. 12 shows the detecting elements as seen from the direction of the optical axis.
Figure 13:
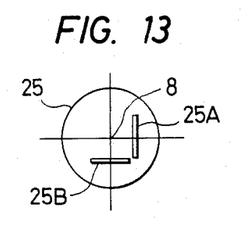
FIG. 13 shows an aperture as seen from the direction of the optical axis.

FIG. 11 shows a different embodiment, in which at least three light beams are applied to different positions on the lens to be examined through an aperture 25 (see FIG. 13) having vertical and horizontal slit openings 25A and 25B and the light beams passed through the lens to be examined are received by two one-dimensional light position detecting elements 26A and 26B (see FIG. 12) disposed parallel to the slit openings 25A and 25B of the aperture and perpendicularly to each other. The aperture 25 and the detecting elements 26A and 26B are conjugate with each other, and light sources 21A–21C and the lens 3 to be examined are conjugate with each other.

By the lens 3 to be examined being made conjugate with the light sources 21A–21C, the light beams become smaller to increase the accuracy. As in the previously described embodiment, the aperture 25 is provided at the forward focus position of a lens 6 and the detecting elements 26A and 26B are provided at the rearward focus position of a light-receiving lens 7. The detecting elements 26A and 26B may be semiconductor position detectors which provide analog signals or CCDs which provide digital signals.

Figure 14:
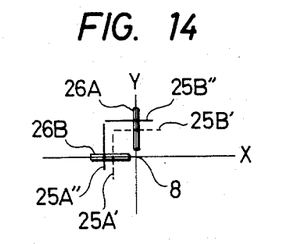
FIG. 14 is a view in which the image of the aperture is projected upon the detecting elements.

FIG. 14 shows a condition in which the images of the slit openings 25A and 25B of the aperture 25 have been projected upon the detecting elements 26A and 26B. The images when the lens 3 to be examined is absent are indicated by dot-and-dash lines 25A' and 25B', and the images when the lens 3 to be examined is present are indicated by 25A" and 25B". The deviation vector obtained by synthesizing the positional deviation with the directionality of the images 25A' and 25A" taken into consideration and the positional deviation with the directionality of the images 25B' and 25B" taken into consideration provides the deviation information of the light beam passed through the lens 3 to be examined.

During measurement, the light sources 21A, 21B and 21C are successively turned on, the positional deviation in each case is found and the spherical refractive characteristics, the degree of astigmatism and the direction of astigmatism of the lens 3 to be examined are found from six data. In this case, measurement is effected with the center of the lens 3 to be examined being coincident with the optical axis 8. That is, the lens is set so that $$Ax + Bx + Cx = 0$$

$$Ay + By + Cy = 0$$

where Bx, By, Cx and Cy, like Ax and Ay, are the positional deviations of the images on the detecting elements 26B and 26A when the light source 21A is turned on, relative to the light sources 21B and 21C, with the directionality taken into account. The method of finding the degree of astigmatism of the lens to be examined is similar to what has been previously described.

That is, if the component of the combined deviation vector A when the light source 21A is turned on in the direction passing through the light sources 21A and 21B is $A_{AB}$ and the component of the combined deviation vector B when the light source 21B is turned on in the direction passing through the light sources 21B and 21A is $B_{BA}$, the refractive power $D_{AB}$ in the meridian direction passing through the light sources 21A and 21B is $$D_{AB} = A_{AB} + B_{BA}.$$

Likewise, $$D_{BC} = B_{BC} + C_{CB}$$

$$D_{CA} = C_{CA} + A_{AC}.$$

If these are substituted into the general equation $D = \alpha \sin^2(\theta + \beta) + \gamma$ and the equation is solved, the degree of astigmatism $\alpha$, the direction of astigmatism $\beta$ and the refractive power $\gamma$ will be calculated.

Figure 15:
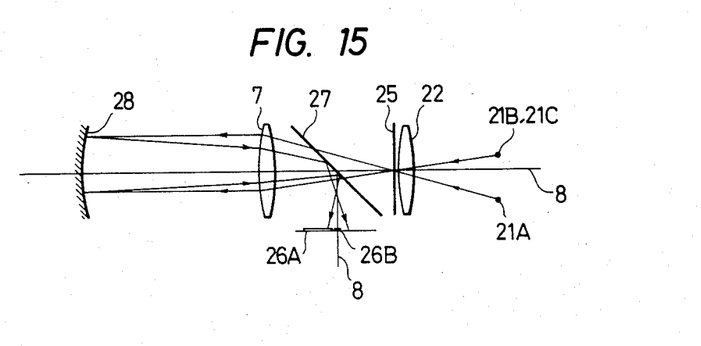
FIG. 15 shows a case where a concave mirror is measured.
Figure 16:
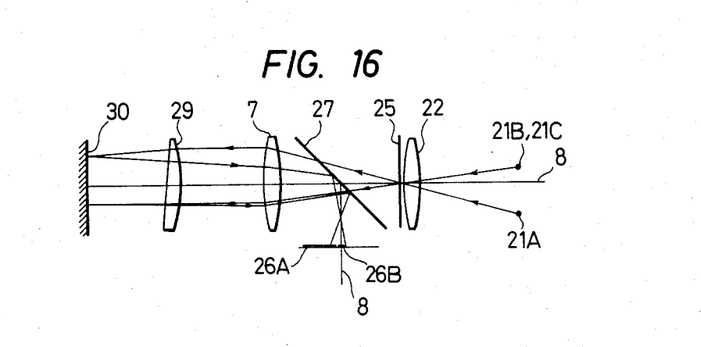
FIG. 16 shows a case where measurement is effected with a light beam passed twice through an optical element to be measured.

FIG. 15 shows a case where a concave mirror 28 is measured as an optical element to be examined. An aperture 25 and detecting elements 26A, 26B are provided conjugately through a light splitting member 27. FIG. 16 shows a case where an optical element 29 to be examined is provided between a lens 7 and a planar mirror 30. In this case, the light beam passes twice through the optical element 29 to be examined and therefore, the angle of deflection doubled and the accuracy of detection increases.

FIGS. 17 to 23 show an embodiment in which not three but at least five light beams are applied to different positions on an optical element to be examined. The light beams passed through the optical element to be examined are received by a two-dimensional light position detecting element, a general quadratic curve equation is solved from five position coordinates to specify an ellipse passing through the five position coordinates, and the degree of astigmatism, the direction of astigmatism and the refractive power are calculated from the ellipse.

Figure 17:
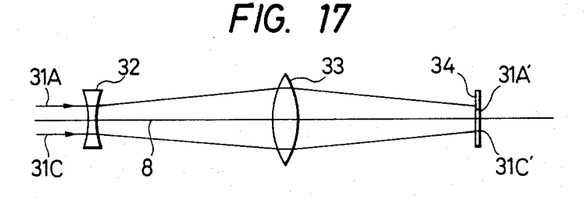
FIG. 17 shows an embodiment of the present invention in which five or more light beams are used to specify a general elliptical curve, thereby measuring the degree of astigmatism, etc.

In FIG. 17, five light beams 31A-31E pass through an optical element 32 to be examined and are refracted thereby and further pass through a light-receiving lens 33 to a two-dimensional light position detecting element 34 such as CCD. The optical element to be examined is usually a cylindrical spherical lens in the case of a spectacle lens.

Figure 18:
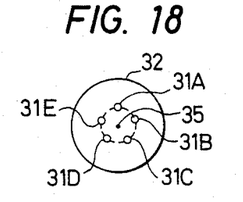
FIG. 18 shows the optical element to be measured as seen from the direction of the optical axis.

FIG. 18 shows the optical element 32 to be examined as seen from the direction of the optical axis 8. A detecting element 34 is disposed at the rearward focus position of the light-receiving lens 33 or at a position optically conjugate therewith. Accordingly, the positions of the light beams impinging on the detecting element 34 are displaced in proportion to the angles of deflection of the light beams. The light beams 31A-31E are parallel to one another and to the optical axis 8, and they will gather at the center of the detecting element 34 if the optical element 32 to be measured is absent. If the optical element 32 to be measured is a cylindrical spherical lens, the light beams 31A-31E will be present on the circumference of an ellipse. Thus, if a general quadratic curve equation $ax^2+by^2+cxy+dx+ey+1=0$ is solved conversely from the light beam positions and this ellipse is found, the refractive value of the cylindrical spherical lens can be found. That is, by rotation of the axis of coordinates, with $$\frac{x^2}{a_0^2} + \frac{y^2}{b_0^2} = 1,$$

the degree of astigmatism $\alpha$ and the refractive power $\gamma$ can be found from $a_0$ and $b_0$ and the direction of astigmatism can be found from the angle of rotation of the axis of coordinates.

Figure 19:
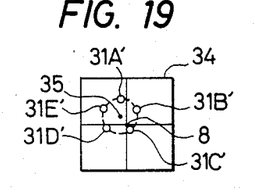
FIG. 19 shows a two-dimensional light position detecting element as seen from the direction of the optical axis.

The position of the central point 35 of this ellipse shown in FIG. 19 represents the degree of eccentricity of the lens 3 to be examined relative to the optical axis 8 and provides the alignment information.

Figure 20:
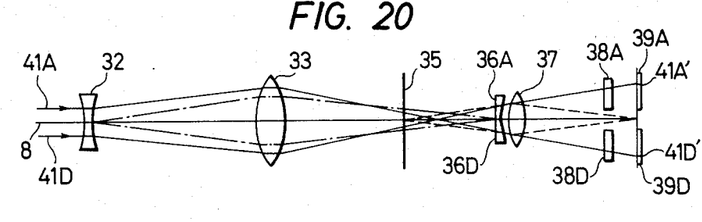
FIG. 20 shows a case where one-dimensional light position detecting elements are used.

FIG. 20 shows a case where a one-dimensional light position detecting element is used as the detecting element. In this case, six light beams are used.

In FIG. 20, six light beams 41A-41F are applied to the optical element 32 to be measured, are refracted by the optical element 32 to be measured, pass through the rearward focus position 35 of the light-receiving lens 33, are refracted outwardly from the optical axis 8 by wedge prisms 36A-36F and pass through a relay lens 37 and cylindrical lenses 38A-38F to one-dimensional position detecting elements 39A-39F. The optical element 32 to be measured is conjugate with the wedge prisms 36 and the rearward focal plane 35 is conjugate with the surfaces of the detecting elements 39. The cylindrical lenses 38A-38F have a refractive power in a direction perpendicular to the plane of the drawing sheet and render the surfaces of the wedge prisms 36A-36F optically conjugate with the surfaces of the detecting elements 39A-39F.

Figure 21:
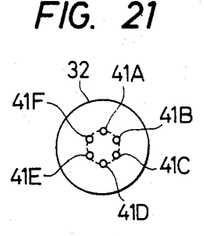
FIG. 21 shows the optical element to be measured as seen from the direction of the optical axis.
Figure 22:
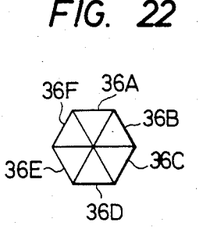
FIG. 22 shows wedge prisms as seen from the direction of the optical axis.
Figure 23:
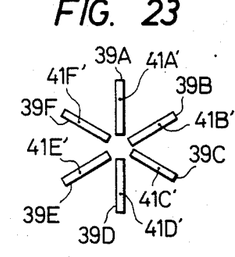
FIG. 23 shows the one-dimensional light position detecting elements as seen from the direction of the optical axis.

FIG. 21 shows the optical element 32 as seen from the direction of the optical axis and in this Figure, the irradiation positions of light beams 41A-41F, which are equidistant from the optical axis, are shown. FIG. 22 shows the details of the aforementioned wedge prisms. The wedge prisms comprise prisms 36A-36F and deflect the light beams to the outside of the optical axis 8 and distribute the light beams to the respective detecting elements 39A-39F. FIG. 23 shows the detecting elements 39A-39F and the light beams which have impinged thereon. The cylindrical lenses 38A-38F are disposed correspondingly to the respective detecting elements 39A-39F and have the function of ensuring that the light beams impinge on the detecting elements even if the light beams are deflected in the direction perpendicular to the plane of the drawing sheet. Of the six points detected, five points are used to specify the ellipse as previously described, and thus the degree of astigmatism, the direction of astigmatism and the refractive power are calculated. The center position of the ellipse coupling the light beams 41A'-41F' of the detecting elements 39A-39F corresponds to the aforementioned center position 35 and provides the information of the deviation of the optical element 32 from the optical axis 8 to thereby enable alignment to be accomplished.

Where the detecting elements are sensor arrays such as CCDs as in the previously described embodiment, the light beams can be applied at one time, but where the detecting element is a single element such as a semiconductor position detector which puts out an analog signal, the light sources are successively turned on so that light beams are successively applied to the optical element to be examined.

According to the present invention, as described above, there is no movable portion and the electrical output from the detecting element is used to enable automatic measurement of the refractive characteristics.

In the present invention, three light beams may first be used to effect measurement of the refractive characteristics from the refractive powers in three meridian directions and further, two light beams may be added and measurement of the refractive characteristics may be effected from an elliptical shape which specifies five deviated beam positions, whereby the adequateness of the two measurement results can be confirmed.

What is claimed is:

1. A method of measuring refractive characteristics of an optical element to be measured, said method comprising the steps of:
    applying at least three light beams to different positions on the optical element to be measured, receiving the light beams coming via said optical element to be measured by a light position detecting element and detecting at least three deviation vectors indicative of the degrees of deviation of said light beams;
    calculating the refractive characteristics in at least three predetermined meridian directions from said deviation vectors; and
    specifying the degree of astigmatism, the direction of astigmatism and the refractive power from the refractive characteristics in said three meridian directions.

2. A method according to claim 1, further comprising the step of effecting alignment by making the vector sum of said deviation vectors zero and calculating the refractive characteristics in the three meridian directions after said alignment.

3. A method according to claim 1, wherein the light beams are successively applied to three points on a circumference centered at a point on the optical axis of said optical element to be measured.

4. An apparatus for measuring refractive characteristics of an optical element to be measured, said apparatus comprising:
 means for applying at least three light beams to different positions on the optical element to be measured;
 a light-receiving imaging system for receiving the light-beams passed through said optical element to be measured;
 light position detecting means provided at the focus position of said light-receiving imaging system; and
 means for finding the refractive characteristics of the optical element to be measured in three predetermined meridian directions from at least three deviation vectors determined by said light position detecting means and indicative of the degrees of deviation of said light beams, and calculating the degree of astigmatism, the direction of astigmatism and the refractive power therefrom.

5. An apparatus according to claim 4, further having means for condensing said light beams on said optical element to be measured.

6. An apparatus according to claim 4, wherein said light position detecting means is a two-dimensional light position detecting element.

7. An apparatus according to claim 4, wherein said light position detecting means comprises a plural-division element and means defining a predetermined aperture through which light beams from said applying means are applied to said optical element to be measured, and wherein the degree of deviation of the light beams from said aperture on said plural-division element is detected.

8. An apparatus according to claim 4, wherein said light position detecting means comprises two one-dimensional detecting elements orthogonal to each other and means defining two slit openings through which light beams from said applying means are applied to said optical element to be measured, said slit openings being parallel to said detecting elements and orthogonal to each other, and wherein the degrees of deviation of the images of said slit openings on said one-dimensional detecting elements, is detected.

* * * * *

UNITED STATES PATENT AND TRADEMARK OFFICE
CERTIFICATE OF CORRECTION

PATENT NO. : 4,609,287
DATED : September 2, 1986
INVENTOR(S) : YOSHIMI KOHAYAKAWA It is certified that error appears in the above-identified patent and that said Letters Patent is hereby corrected as shown below:

AT [56] IN THE REFERENCES

U.S. Patent Documents, "4/1981 Cornsweet" should read --8/1981 Cornsweet--.

COLUMN 3

Lines 38-39, "X components" should read --Y components--.
Line 58, "represents" should read --represent--.

COLUMN 9

Line 2, "deflection doubled" should read --deflection is doubled--.

UNITED STATES PATENT AND TRADEMARK OFFICE
CERTIFICATE OF CORRECTION

PATENT NO. : 4,609,287

DATED : September 2, 1986

INVENTOR(S) : YOSHIMI KOHAYAKAWA

It is certified that error appears in the above-identified patent and that said Letters Patent is hereby corrected as shown below:

<u>COLUMN 11</u>

Line 18, "light-beams" should read --light beams--.

Signed and Sealed this

Nineteenth Day of July, 1988

Attest:

DONALD J. QUIGG

*Attesting Officer*   *Commissioner of Patents and Trademarks*